(12) United States Patent
Liu et al.

(10) Patent No.: US 10,599,493 B2
(45) Date of Patent: Mar. 24, 2020

(54) METHOD AND MODULE IN OPERATING SYSTEM FOR CONTROLLING HARDWARE DEVICE

(71) Applicant: KUANG-CHI INTELLIGENT PHOTONIC TECHNOLOGY LTD., Shenzhen (CN)

(72) Inventors: Ruopeng Liu, Shenzhen (CN); Xudong Wang, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 188 days.

(21) Appl. No.: 15/437,047

(22) Filed: Feb. 20, 2017

(65) Prior Publication Data

US 2017/0161125 A1  Jun. 8, 2017

Related U.S. Application Data

(63) Continuation of application No. PCT/CN2015/087608, filed on Aug. 20, 2015.

(30) Foreign Application Priority Data

Aug. 20, 2014 (CN) .......................... 2014 1 0415227
Sep. 10, 2014 (CN) .......................... 2014 1 0456540
Sep. 28, 2014 (CN) .......................... 2014 1 0510111

(51) Int. Cl.
*G06F 9/54* (2006.01)
*G06F 13/10* (2006.01)
(Continued)

(52) U.S. Cl.
CPC ............ *G06F 9/545* (2013.01); *G06F 9/4411* (2013.01); *G06F 9/4494* (2018.02); *G06F 9/44521* (2013.01); *G06F 13/105* (2013.01)

(58) Field of Classification Search
CPC ...... G06F 9/545; G06F 9/4494; G06F 9/4411; G06F 9/44521; G06F 13/105
See application file for complete search history.

(56) References Cited

U.S. PATENT DOCUMENTS 5,964,843 A   10/1999   Eisler et al.

FOREIGN PATENT DOCUMENTS

CN    1442000 A    9/2003
CN    2759098 Y    2/2006
(Continued)

OTHER PUBLICATIONS

Yi-Jen Mon; Android-based Java Programming for Mobile Phone LED Control; Mar. 2013; 6 pages (Year: 2013).*
(Continued)

*Primary Examiner* — Doon Y Chow
*Assistant Examiner* — Kimberly L Jordan
(74) *Attorney, Agent, or Firm* — Armstrong Teasdale LLP

(57) ABSTRACT

A method, comprises: obtaining state data for controlling a hardware device action, delivering and storing the state data into a buffering unit, and invoking a hardware device driver, where the hardware device driver reads state data in the buffering unit, and controls a state of a hardware device action according to the state data. The invoking the hardware device driver includes: invoking an existing hardware device driver to control the hardware device action; or obtaining an instruction for loading a link library and loading the link library; obtaining an instruction for controlling the hardware device action; invoking, from the link library, a performance implementation function corresponding to the instruction; and executing the invoked performance implementation function to control a hardware device to perform a corre-
(Continued)

sponding action. The hardware device driver uses a direct control manner to control the hardware device to execute an action.

9 Claims, 5 Drawing Sheets

(51) Int. Cl.
*G06F 9/445* (2018.01)
*G06F 9/448* (2018.01)
*G06F 9/4401* (2018.01)

(56) References Cited

FOREIGN PATENT DOCUMENTS

| CN | 102629202 A | 8/2012 |
|---|---|---|
| CN | 103353839 A | 10/2013 |
| CN | 103488478 A | 1/2014 |
| CN | 103970559 A | 8/2014 |
| CN | 104216709 A | 12/2014 |
| CN | 104267956 A | 1/2015 |
| CN | 104636128 A | 5/2015 |
| JP | 2002-501243 A | 1/2002 |
| KR | 10-2012-0110693 A | 10/2012 |
| KR | 10-2014-0077188 A | 6/2014 |
| WO | 2012/173638 A1 | 12/2012 |
| WO | 2012173638 A1 | 12/2012 |

OTHER PUBLICATIONS

Shane Conder, Lauren Darcey; Android Wireless Application Development; Dec. 2010; 793 pages (Year: 2010).*
Yi-Jen Mon: "Android-based java Programmng for Mobile Phone LED Control", IJCSI International Journal of Computer Science Issues, Mar. 31, 2013 (Mar. 31, 2013), pp. 50-57, XP055483811, Retrieved from the Internet: URL:http://web.archive.org/web/20140730005157if_/http://ijcsi.org/papers/IJCSI-10-2-2-217-222.pdf [retrieved on Jun. 13, 2018].
Shane Conder et al: "Android Wireless Application Development, Portable Documents" In: "Android Wireless Application Development, Portable Documents", Dec. 25, 2010 (Dec. 25, 2010), XP055449669, ISBN: 978-0-321-74301-5 pp. ToC,11-28,133-138,423-443, * pp. 38,56 *.
Supplementary Partial European Search Report for EP No. 15833667.7 dated Jun. 21, 2018.

* cited by examiner

| | | |
|---|---|---|
| User space | A fifth layer 206 | Applications (Java application) |
| | A fourth layer 205 | Application Framework |
| | A third layer 203, 204 (JNI layer) | Libraries、Android Runtime （JNI） |
| | A second layer 202 | HAL layer |
| Kernel space | A first layer 201 | Linux Kernel: serial device driver (such as a flash driver) |
| Hardware | | Serial communications device (such as a flash) |

METHOD AND MODULE IN OPERATING SYSTEM FOR CONTROLLING HARDWARE DEVICE

CROSS REFERENCE TO RELATED APPLICATIONS

This application is a continuation of PCT Application No. PCT/CN2015/087608 filed on Aug. 20, 2015, which claims priority to CN 201410415227.2 filed 2014 Aug. 20, CN 201410456540.0 filed 2014 Sep. 10, and CN 201410510111.7 filed 2014 Sep. 28, all of which are incorporated herein by reference.

TECHNICAL FIELD

This application relates to development of an operating system of an electronic device, and in particular, to a method and a module in an operating system for controlling a hardware device.

BACKGROUND

Refer to FIG. 1, which is a schematic diagram of an Android system architecture.

The first layer 101 is a Linux kernel drive layer, which is implemented by C/C++. Android core system services depend on the Linux kernel, including security, memory management, process management, network protocols, drive models, and the like. The Linux kernel is also used as an abstraction layer between hardware and a software stack. In addition to a standard Linux kernel, kernel drivers such as a Binder (IPC) driver, a camera driver and a power supply management driver are added in the Android system.

The second layer is a component library layer and a virtual machine layer. 102 is a component library layer (Libraries), and 103 is a virtual machine layer (Android Runtime). The component library layer 102 is implemented by C/C++, including a C/C++ library, which is available to different components in the Android system. They provide services for a developer by an Android application framework. As a run environment of the Android system, the virtual machine layer 103 provides most functions of a Java programming language core library, and consists of a Dalvik Java virtual machine and a basic Java class library.

The third layer 104 is an application framework layer. In the Android system, the developer can fully access an API (Application Programming Interface, application programming interface) framework used by core applications.

The fourth layer 105 is an application layer (Applications) layer. All Android applications are compiled in a Java language. An Android application developed by a user and an Android core application are on the same layer, and are all constructed based on an Android system API.

Currently, multitudinous electronic devices use the Android system, and a flash is installed on hardware of the devices. In most circumstances, the user has a need to use the flash. Therefore, how to control the flash in the Android system is a question under research by a person skilled in the art.

On the one hand, with development of optical communication, more electronic devices perform optical communication by a flash. In the Android system, the user exercises control, for example, on the application layer, and sends data by means of optical communication by the flash. In this case, the data is to-be-sent data. According to a corresponding encoding rule, the data is converted into time data that controls on and off states of the flash. That is, time data that controls on and off states of the flash is generated on the application layer. However, after the application layer obtains an instruction of controlling the flash, instructions of invoking a flash driver are sent one by one. After executing one instruction, the flash driver waits for a next instruction sent by the application layer. The instruction transmitted from the application layer to the driver layer needs to pass through layers such as the application framework layer, the component library layer, and the virtual machine layer. In this process, a delay is inevitable, and affects accuracy of data transmission in the optical communication process.

In the optical communication, visible light communication is generally applied. Visible light is applicable to both data transmission and illumination. However, due to the delay problem, a transmission speed (a flashing frequency of the visible light) needs to be restricted properly to ensure data accuracy in the data transmission process. Therefore, applicability is not good when the data needs to be transmitted at a high speed.

On the other hand, to control the on or off state of the flash in the Android system, a camera driver is generally invoked first, an inherent interface of a camera is used, and parameters of the camera are set to turn on or off the flash. This manner of controlling the flash is indirect control, and suffers a specific delay when the flash is invoked.

Technical Problem

In the prior art, a camera driver is invoked first, an inherent interface of a camera is used, and camera parameters are set to control an on or off state of a flash, which is indirect control and suffers a specific delay in invoking the flash.

Technical Solution

According to a first aspect of this application, this application provides a method for controlling a hardware device in an operating system, including: obtaining an instruction for loading a link library, and loading the link library, where the link library includes a performance implementation function for controlling a hardware device action; obtaining an instruction for controlling the hardware device action; invoking, from the link library, a performance implementation function corresponding to the instruction for controlling the hardware device action; and executing the invoked performance implementation function to control a hardware device to perform a corresponding action.

According to a second aspect of this application, this application provides a module for controlling a hardware device in an operating system, including: a loading unit, configured to obtain an instruction for loading a link library, and load the link library, where the link library includes a performance implementation function for controlling a hardware device action; a detection unit, configured to obtain an instruction for controlling the hardware device action; an invoking unit, configured to invoke, from the link library, a performance implementation function corresponding to the instruction for controlling the hardware device action; and a second execution unit, configured to control a hardware device driver to execute the invoked performance implementation function to control a hardware device to perform a corresponding action.

According to a third aspect of this application, this application provides a method for controlling a hardware device in an operating system, including: obtaining state data for controlling the hardware device action; delivering and storing the state data into a buffering unit; and invoking a hardware device driver, where a light emitting device driver reads the state data stored in the buffering unit, and controlling a state of the hardware device action according to the state data.

According to a fourth aspect of this application, this application provides a module for controlling a hardware device in an operating system, including: a state data obtaining unit, configured to control an application layer to obtain state data for controlling a hardware device action; a transmission unit, configured to control the application layer to deliver the state data; a buffering unit, configured to store the state data delivered by the application layer; and an execution unit, configured to control the application layer to invoke a hardware device driver located on a kernel driver layer, control the hardware device driver to read the state data stored in the buffering unit, and control a state of the hardware device action according to the state data.

Beneficial Effects

In a method and a module for controlling a hardware device in an operating system according to this application, after state data for controlling a hardware device action is obtained, the state data is delivered and stored into a buffering unit, then a hardware device driver is invoked, and the hardware device driver reads state data stored in the buffering unit and controls a state of a hardware device action according to the state data. The invoking the hardware device driver specifically includes: invoking an existing hardware device driver to control the hardware device action; or obtaining an instruction for loading a link library and loading the link library; after obtaining an instruction for controlling the hardware device action, invoking, from the link library, a performance implementation function corresponding to the instruction for controlling the hardware device action; and then executing the invoked performance implementation function to control a hardware device to perform a corresponding action. In the method and module for controlling a hardware device in an operating system according to this application, the hardware device driver uses a direct control manner to control the hardware device to execute a corresponding action. In addition, because the state data is stored in the buffering unit, the state data stored in the buffering unit is read directly after the hardware device driver is invoked. The reading process is continuous, which avoids problems such as interruption and delay in a process of driving the hardware device action by the hardware device driver, improves data transmission accuracy, and ensures high-speed data transmission.

DESCRIPTION OF EMBODIMENTS

To facilitate understanding of this application, controlling an on or off state of a light emitting device (flash) in an Android system is used as an example in embodiments of the present application. Understandably, an operating system referred to herein may be other operating systems such as a Blackberry OS system, a windows phone system, a windows mobile system, an IOS system, or a Mac OS system. The hardware device may be a camera, a vibrator, a Bluetooth device, a sensor, a microphone, or the like in an electronic device.

The following further describes this application with reference to specific embodiments.

Embodiment 1

In the embodiment of this application, a kernel driver (a flash driver) is implemented in a Linux kernel space (Linux Kernel layer), and a hardware abstraction layer interface is implemented in a user space, so as to provide hardware access interface for an upper layer, that is, provide a hardware service for an application framework layer of the Android system. An application in the Android system is compiled in a Java language, a hardware driver is implemented in a C/C++ language, and Java provides JNI (Java Native Interface, Java native invoking) method invoking. Therefore, a Java application can use JNI to invoke a hardware abstraction layer interface.

Figure 2:
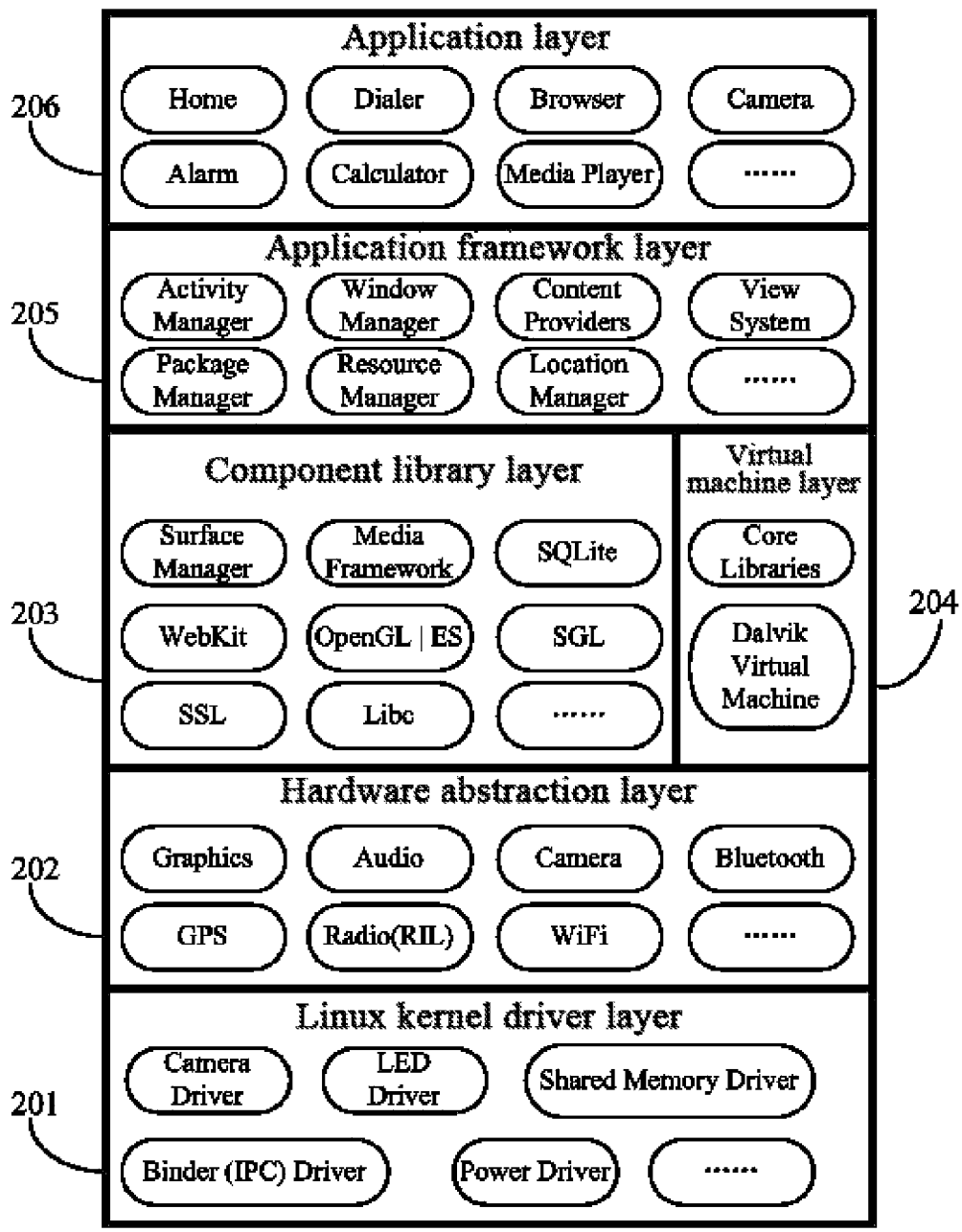
FIG. 2 is a schematic diagram of an architecture of an Android system according to Embodiment 1 of this application.

Referring to FIG. 2, in this embodiment, an architecture of the Android system is divided into five layers. The first layer 201 is a Linux kernel driver layer, the second layer 202 is a hardware abstraction layer (HAL), the third layers 203 and 204 are a component library layer 203 (Libraries) and a virtual machine layer 204 (Android Runtime), the fourth layer 205 is an application framework layer, and the fifth layer 206 is an application layer.

Figures 3, 4:
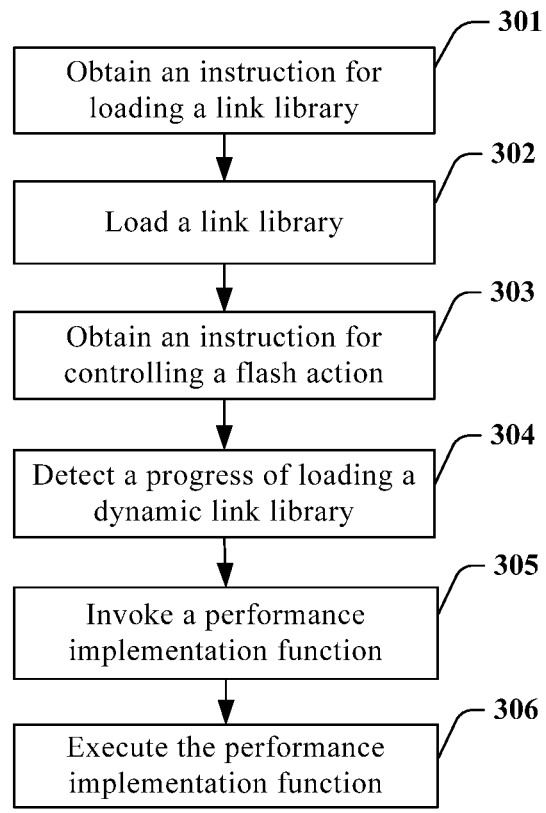
FIG. 3 is an analytic schematic diagram of an architecture of an Android system according to Embodiment 1 of this application.
FIG. 4 is a schematic flowchart of a method for controlling a hardware device in an Android system according to Embodiment 1 of this application.

Based on FIG. 2, FIG. 3 shows analysis of an architecture of an Android system from another perspective. The entire Android system may be divided into three parts: hardware, a kernel space, and a user space, and architecture content included in the three parts is shown in FIG. 3.

In this embodiment, the JNI layer is deemed the third layer, and the JNI layer designs a series of interface functions for the application framework layer. In a specific implementation of the interface functions, a callback function is used to interact with the hardware abstraction layer.

Figure 1:
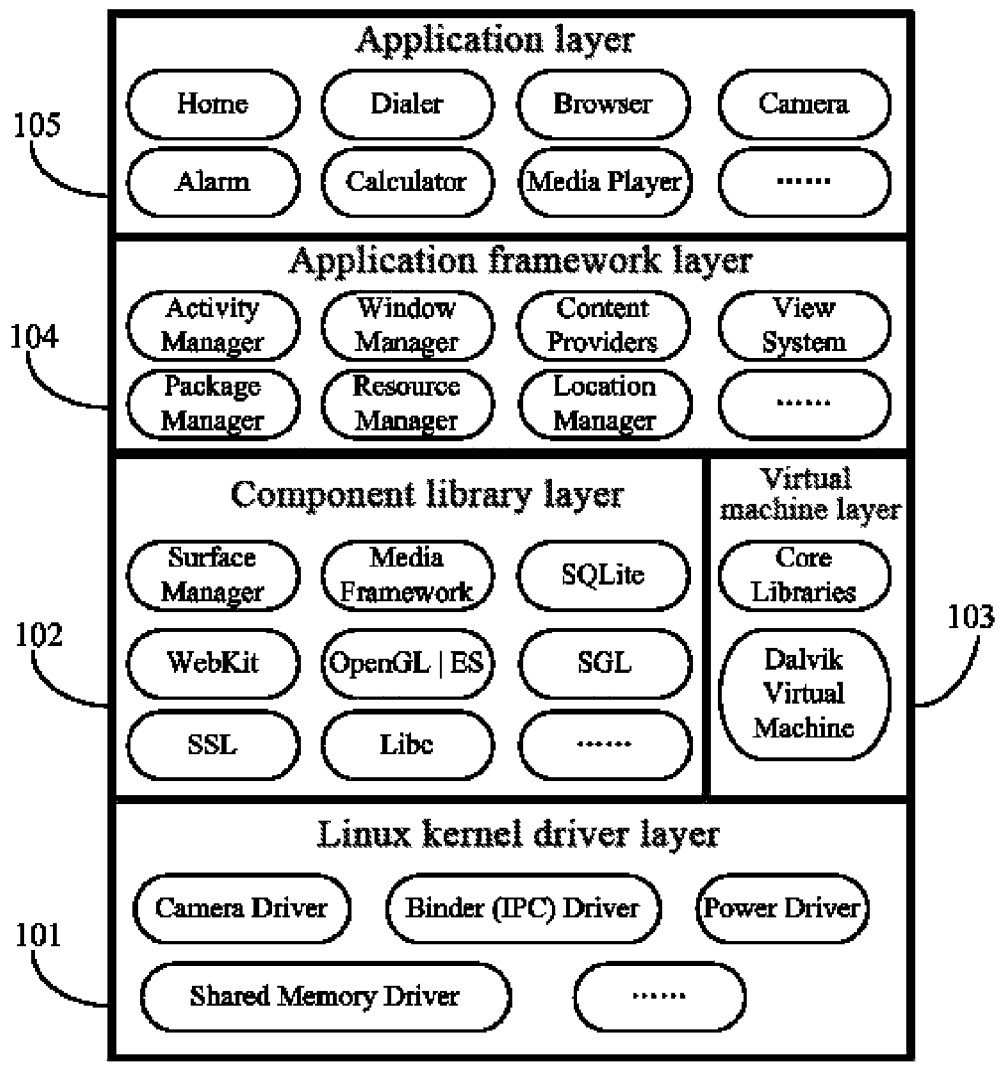
FIG. 1 is a schematic diagram of an architecture of an Android system.

It should be noted that the method for controlling an on or off state of a flash in this embodiment is also applicable to an Android system with an architecture shown in FIG. 1. A purpose of adding a hardware abstraction layer in this embodiment is to provide an access path for a hardware device that has no standard Linux kernel driver interface, convert a hardly readable interface into a well readable interface, and provide the interface for being invoked by an upper layer program. That is, the hardware abstraction layer runs on the Linux kernel driver layer, and is used to provide flash control interface implementation for the application framework layer and the JNI layer under support of the Linux kernel driver layer.

An internal framework of layers in FIG. 1 and FIG. 2 are well known to a person skilled in the art, and are not interpreted and described exhaustively herein.

Referring to FIG. 4, a method for directly controlling an on or off state of a flash in an Android system is provided in this embodiment, including the following steps:

Step 301: An application framework layer detects and obtains an instruction for loading a link library.

In a specific embodiment, on one hand, after startup, the Android system automatically loads a corresponding link library. Therefore, the instruction for loading a link library may be an instruction sent by the Android system after startup. On the other hand, the link library needs to be loaded only when the corresponding performance implementation function needs to be invoked. Therefore, the instruction for loading a link library may be an instruction sent by the Android system when the Android system detects a need to invoke the performance implementation function.

Step 302: The application framework layer loads a link library, where the link library includes a performance implementation function for controlling a flash action.

The performance implementation function is a function for controlling a flash action, for example,

```
led_on
led_off
......
```

Alternatively, when an LED driver signal needs to be given by another device such as a CPU chip or a camera chip, this device needs to be turned on first, and then drives the LED to emit light. This brings an advantage of controlling the flash in a more flexible mode, for example, by using different colors, different luminance or the link, and therefore, the following function may be compiled:

```
led_device_open //turn on the flash (optional,
for a purpose of turning on the device)
led_device_close //turn off the flash
(optional, for a purpose of turning off the
device)
led_on
led_off
......
```

After being defined, the function for controlling the flash action may be stored in a .c file, where the .c file includes definitions of all variables and functions.

Step 303: An application layer obtains an instruction for controlling the flash action. This instruction may be an instruction input by a user on a man-machine interaction interface (that is, an application layer) of the Android device and is used to control the flash action; or may be an instruction string encoded on the application layer, for example, a data string denoted by "0" and "1", where "0" refers to turning off the flash, and "1" refers to turning on the flash.

Based on step 301, in step 303, the instruction for controlling the flash action may also be used as an instruction for loading a link library, and the instruction for controlling the flash action may be understood as a need to invoke the performance implementation function. Therefore, it should be noted that the order of the steps of the method provided in this embodiment should not be understood as a limitation on this application. In other embodiments, the order of the steps may change properly according to actual conditions.

Step 304: The application layer detects whether the link library is loaded completely, and if the link library is not loaded completely, waits for completion of loading of the link library, or if the link library is loaded completely, performs step 305.

Step 305: The application layer invokes, from the link library, a performance implementation function corresponding to the instruction for controlling the flash action.

The application layer may invoke the performance implementation function after detecting completion of loading all link libraries, or invoke the performance implementation function while detecting the loading, or invoke the performance implementation function after a specified time is set and met.

Step 306: The Linux kernel driver layer executes the invoked performance implementation function to control a flash to perform a corresponding action.

In this embodiment, a flash driver is disposed in the Linux kernel driver layer. The flash driver executes the invoked performance implementation function to control the flash to perform a corresponding action.

Currently, the flash is generally used as only auxiliary hardware of a camera. The flash may be applied only when the camera is applied. Therefore, to use the flash in the Android system, the camera driver needs to be invoked first. The flash is controlled by setting camera parameters. That is, the flash is controlled in an indirect control manner.

A delay problem occurs when the flash is controlled by the camera driver. However, in the current application scope of the flash, the delay does not affect normal usage. However, with development of optical communication (for example, visible light communication), when information needs to be transmitted through light, due to requirements imposed by the optical communication on the transmission speed and information transmission accuracy, the delay problem becomes obvious and becomes one of obstacles in developing optical communication.

In this embodiment, a flash driver is disposed separately on a Linux kernel driver layer of the Android system, and the flash driver may be invoked directly for controlling the flash. The flash driver controls the flash in a direct control manner, which can avoid the delay that occurs when the flash is controlled by the camera driver.

An interface function is defined on the JNI layer. The application layer invokes, from the link library according to the interface function on the JNI layer, the performance implementation function corresponding to the instruction for controlling the flash action, so that the performance implementation function is available for the flash driver on the Linux kernel driver layer to execute a corresponding performance implementation function.

When the operating system is an IOS system, syscall serves a purpose of an interface function at a native interface, where the interface function is defined on the JNI layer in the Android system, which is not detailed herein any further.

The interface function on the JNI layer defines a correspondence between a C/C++ function and a Java function. This interface function uses a JNI method to map the C/C++ function on the hardware abstraction layer onto the Java function on the application layer to implement interaction between the hardware abstraction layer (using a C/C++ language) and the application layer (using a Java language). led_on is a Java function. A bottom-layer performance function can be invoked only after the Java function is mapped by the JNI interface. The Java function is mapped to a native function on the JNI layer, and then the bottom-layer performance function is invoked in the function, where the name of the native function is java_full packet name_class name_led_on.

When a Dalvik virtual machine in an Android running environment invokes a member function, if it is found that the member function is a JNI method, the process is redirected to an address of the JNI method directly to execute the JNI method. That is, the JNI method is executed on a native operating system directly, but is not executed by a Dalvik virtual machine interpreter. Therefore, the JNI method is a means for direct communication between the Android application and the native operating system, and the JNI method makes communication more efficient.

Preferably, an instantiated address of the performance implementation function is stored on the JNI layer so that the JNI layer can directly invoke the performance implementation function conveniently. Instantiation refers to a process of using a class to create an object in object-oriented programming. For example, in a flash control process, the flash action is used as a class, and a specific performance implementation function such as turning on the flash and turning off the flash is created as an object. A process of creating the objects is instantiation. After the object is created, a corresponding address exists. When the performance implementation function is invoked later after the address is stored on the JNI layer, the corresponding object can be found quickly according to the address without needing to retrieve the class corresponding to the performance implementation function first.

Three structures are defined on the hardware abstraction layer in this embodiment:

struct hw_module_t; //module type: Each hardware module needs to declare a hal_module_info_sym data structure, and the first member of the structure needs to be a structure that uses hw_module_t as data.

struct hw_module_methods_t; //module method: The structure provides only an open function interface for turning on a special device, where inbound parameters are "hw_module_t, id" and "w_device_t", and the function is used to initialize each member of hw_device_t.

struct hw_device_t. //device type: For each device, the data structure needs to begin with this structure, and this structure is a preamble of all devices and precedes data of each device.

In this embodiment, when defining a structure of a hardware module type, the hardware abstraction layer specifies prohibition of directly using the hw_module_t structure, but an inheritance needs to be arranged. That is, this structure needs to be sheathed in another layer of structure. However, the hw_module_t structure needs to be the first member variable data type of the structure to facilitate forced conversion between the two. A part of program code is given below for reference:

```
struct led_module_t
{
    struct hw_module_t common;
};
```

```
struct led_control_device_t
{
    struct hw_device_t common;
    int (*set_on)(struct led_control_device_t *dev, int32_t led);
    int (*set_off)(struct led_control_device_t *dev, int32_t led);
};
struct led_control_context_t
{
    struct led_control_device_t device;
};
```

A purpose of defining the structure is to package related variables and functions together, and encapsulate code to avoid falsification. The structure is a preferred but not mandatory.

The structure is a data set formed from a series of data of the same type or different types. The structure is used to encapsulate values such as attributes and parameters (that is, data members) to form a new type. After the encapsulation, the values such as attributes and parameters may be reused.

For a flash driver, a structure defined by the flash driver may include flash luminance, flash on/off time, or the like. The luminance value and the on/off time are encapsulated as data members in a structure of the corresponding type. In addition, for a structure defined in C++, the data member may be a function, which can used to describe not only a state of an object, but also an action of an object. For example, functions for controlling an on or off state of the flash are LED_ON, LED_OFF, LED_DEVICE_OPEN, and LED_DEVICE_CLOSE, which correspond to the led_on, led_off, led_device_open, and led_device_close functions respectively.

Embodiment 2

Figure 5:
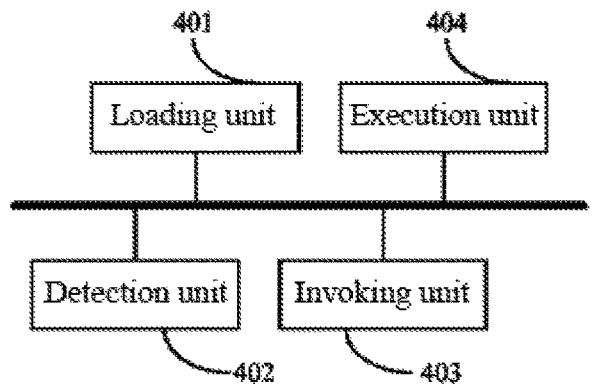
FIG. 5 is a schematic structural diagram of a module for controlling a hardware device in an Android system according to Embodiment 2 of this application.

Referring to FIG. 5, corresponding to a method for directly controlling an on or off state of a flash in the foregoing Android system, a module for directly controlling an on or off state of a flash in an Android system is provided in this embodiment, including a loading unit 401, a detection unit 402, an invoking unit 403, and an execution unit 404.

The loading unit 401 is configured to obtain an instruction for loading a link library, and load the link library, where the link library includes a performance implementation function for controlling a flash action.

The detection unit 402 is configured to obtain an instruction for controlling the flash action.

After detecting completion of loading the dynamic link library loaded by the loading unit 401, the invoking unit 403 invokes, from the link library, the performance implementation function corresponding to the instruction for controlling the flash action, or invokes the performance implementation function while detecting the loading, or invokes in the link library after a specified time is set and met.

The execution unit 404 is used to execute the invoked performance implementation function to control a flash to perform a corresponding action. In a specific embodiment, an architecture of the Android system includes an application layer, an application framework layer, a component library, a virtual machine layer, and a Linux kernel driver layer. A flash driver is disposed in the Linux kernel driver layer. The execution unit 404 is configured to control the flash driver on the Linux kernel driver layer to execute the invoked performance implementation function, so as to control the flash to perform a corresponding action.

The architecture of the Android system includes a JNI layer, and an interface function is defined on the JNI layer. The loading unit 401 is configured to load the link library after the application framework layer is controlled to detect and obtain the instruction for loading a link library. The invoking unit 403 is configured to control the application layer to invoke, from the link library according to the interface function on the JNI layer, the performance implementation function corresponding to the instruction for controlling the flash action, so that the performance implementation function is available for the flash driver on the Linux kernel driver layer to execute a corresponding performance implementation function.

Further, an instantiated address of the performance implementation function is stored on the JNI layer.

Preferably, the architecture of the Android system further includes a hardware abstraction layer. The hardware abstraction layer runs on the Linux kernel driver layer, and is used to provide flash control interface implementation for the application framework layer and the JNI layer under support of the Linux kernel driver layer.

When the operating system is an IOS system, the IOS system further includes a Library adapter, which serves a purpose similar to the hardware abstraction layer in the architecture of the Android system, which is not detailed herein any further.

In the method and module for directly controlling an on or off state of a flash in an Android system according to this embodiment, after an instruction for loading a link library is detected and obtained, a link library is loaded; after an instruction for controlling the flash action is obtained, a performance implementation function corresponding to the instruction is invoked from the link library; and then the invoked performance implementation function is executed to control a flash to perform a corresponding action. In this way, the on or off state of the flash is controlled directly.

The method and the module for directly controlling an on or off state of a flash in an Android system according to this embodiment is further applicable to a WP operating system. Specific implementation is similar and is not detailed herein any further.

Embodiment 3

The conception of this embodiment is: using a buffering unit to store state data first, where the state data is used to control a hardware device action, and data stored in the buffering unit is directly readable by a hardware device driver; after the state data is stored, invoking the hardware device driver, so that the hardware device driver reads state data stored in the buffering unit and controls a state of the hardware device action according to the state data. The hardware device driver reads the state data in the buffering unit continuously without delay or interruption, thereby ensuring data transmission accuracy and ensuring high-speed data transmission.

The hardware device in this embodiment may be a light emitting device, a vibrator, a Bluetooth device, a camera, a sensor, or a microphone. To facilitate description of this embodiment, a light emitting device is used as an example of the hardware device in this embodiment. Accordingly, the hardware device driver is a light emitting device driver, the state data is time data, and the hardware device action is turning on or off the light emitting device.

Figure 6:
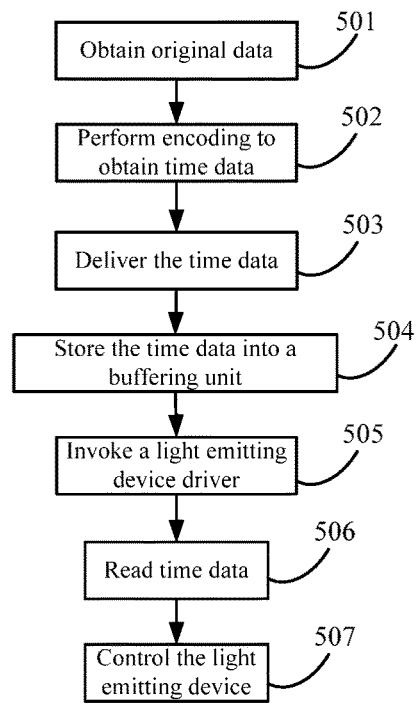
FIG. 6 is a schematic flowchart of a method for controlling a hardware device in an Android system according to Embodiment 3 of this application.

Referring to FIG. 2 and FIG. 6, a method for controlling a hardware device in an operating system is provided in this embodiment, where the hardware device is a light emitting device, and the method includes the following steps:

Step 501: Obtain original data. Specifically, the original data may be data that is input by a user, for example, a bank card account number input by a user. In an Android system, the application layer may obtain the original data.

Step 502: Encode the original data to obtain time data that is used to control an on or off state of a light emitting device, for example, control the light emitting device to be 5 s on, 2 s off, 3 s on, . . . . In an Android system, an application layer may encode the original data.

In some embodiments, if the user directly inputs the time data that is used to control the on or off state of the light emitting device, that is, if the original data is the time data, no encoding operation is required.

Specifically, the light emitting device may be a light source of the electronic device, for example, an LED light source; or may be other light sources, for example, a light source connected to a mobile phone, a laser emitter or an LED.

The obtained original data is generally N-ary data. That is, encoding the original data is equivalent to encoding the N-ary data into an electric signal unit, which is specifically as follows:

The N-ary data is converted into corresponding electric signal units bit by bit. This step includes: encoding each different digit in the N-ary data into a different electric signal unit, where high level duration and low level duration in the electric signal unit are $Ti1$, $Ti2$ . . . , $Tij$ respectively, and $Tij$, $i$, $j$, and $N$ are natural numbers. Different electric signal units are separated by delimiters. As regards the high level and the low level in the electric signal unit in this embodiment, a high level does not come before a low level by default. Instead, a low level may come before a high level. A delimiter between a high level and low level may be a level jump; or a high or low level that continues for different duration is used as a characteristic level, and the delimiter between the high level and the low level is a reference level different from the characteristic level.

In an optional embodiment, at least a part of to-be-encoded N-ary data may be encoded into level signals that are in different states, the data is divided into multiple strata according to a size of the level signals, and a different stratum denotes a different digit in the N-ary data.

In this step, if the original data is not converted into N-ary data, the original data needs to be converted into N-ary data first.

In this embodiment, an operation value between $Ti2$, $Ti3$, . . . and $Tij$ and $Ti1$ is a predetermined value or in a predetermined range, where the operation refers to calculating a ratio, a product, a difference, a sum, a reciprocal, and/or a remainder between $Ti2$, $Ti3$, . . . and $Tij$ and $Ti1$.

In this step, taking binary data as an example, when $N=2$, the binary data 0 is encoded into a first electric signal unit, and high and low level duration in the first electric signal unit is $T11$ and $T12$ respectively; the binary data 1 is encoded into a second electric signal unit, and high and low level duration in the second electric signal unit is $T21$ and $T22$ respectively. $T11$ duration is a preset time, $T12=T11$, $T21=T11$, $T22=m*T21$, and m is a specified coefficient; or $T11$ duration is a preset time range, $T12$, $T11$, and $T21$ are in the same time range, $T122=m*21$, and m is a specified coefficient, which finally makes the operation value between $T22$ and $T21$ be unequal to the operation value between $T12$ and $T11$.

The level jump is a jump from a high level to a low level. In binary data, a level jump occurs in an electric signal unit, in which the high level controls the LED flash to emit light, and the low level controls the LED flash to emit no light; in other embodiments, a reverse control manner may be applied, for example, a level jump from the low level to the high level occurs, in which the low level controls the LED flash to emit light, and the high level controls the LED flash to emit no light.

Step 503: Deliver the time data. In an Android system, a detailed step may be: The application layer delivers the time data to the kernel driver layer.

Step 504: Store the delivered time data into a buffering unit. In the Android system, a detailed step may be: After obtaining the time data delivered by the application layer, the kernel driver layer stores the time data into a buffering unit disposed in the kernel driver layer. The data stored in the buffering unit is directly readable by the light emitting device driver, and the buffering unit serves a purpose of temporarily saving the time data, and may be a buffer register. In other embodiments, the buffering unit may also be some or all space that is separated from an existing system storage unit through a program method, and the some or all space may be used as the buffering unit in this embodiment.

The buffer register is also referred to as a buffer, which may be categorized into an input buffer and an output buffer. The former serves a purpose of temporarily storing data sent by a peripheral so that the data is available for being fetched by the processor; and the latter serves a purpose of temporarily storing data sent by the processor to the peripheral. The buffer may serve a purpose of coordination and buffering between the CPU working at a high speed and the peripheral working at a low speed, and implement synchronization of data transmission.

Step 505: After time data corresponding to to-be-sent data is delivered and stored, invoke a light emitting device driver to ensure that the light emitting device is in an available state. In the Android system, a detailed step may be: The application layer invokes the light emitting device driver located in the kernel driver layer.

Step 506: After the light emitting device driver is invoked, read the time data stored in the buffering unit.

Step 507: After the light emitting device driver reads the time data, control a time of turning on or off the light emitting device according to the time data.

In some embodiments, the time data is an array. Details of controlling a time of turning on or off the light emitting device according to the time data by the light emitting device driver are: controlling, by the light emitting device driver, the on or off time of the light emitting device according to order of data elements in the array. Certainly, in other embodiments, a format of the time data may be other feasible formats in the prior art.

In the method for controlling the light emitting device in an operating system according to this embodiment, the time data that is used to control the on or off state of the light emitting device is stored first by buffering unit; after the time data is stored, the light emitting device driver is invoked, and the light emitting device driver reads the time data stored in the buffer, and controls the on or off time of the light emitting device according to the time data. The light emitting device driver reads the time data in the buffer continuously without delay, thereby ensuring data transmission accuracy and ensuring high-speed data transmission in optical communication.

It should be noted that the operating system in this embodiment may be an Android system, a Blackberry OS system, a Windows phone system, a Windows mobile system, an IOS system, a Mac OS system or the like. Although the systems differ, under the conception of the present invention, a person skilled in the art can make proper modifications to fulfill the purpose of implementing the method for controlling a light emitting device according to this embodiment.

In some embodiments, the state data may also be intensity data that is used to control light emitting intensity of the light emitting device. In other embodiments, if the hardware device is a vibrator, the state data may accordingly be intensity data that is used to control vibration intensity of the vibrator. For other hardware devices, the implementation principles are consistent with the implementation principles of the light emitting device, and are not detailed herein any further.

Embodiment 4

Figure 7:
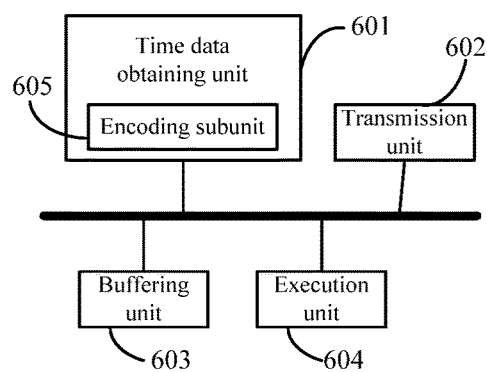
FIG. 7 is a schematic structural diagram of a module for controlling a hardware device in an Android system according to Embodiment 4 of this application.

Referring to FIG. 7, based on the method for controlling a hardware device in an operating system according to Embodiment 3, a module for controlling a hardware device in an operating system is provided in this embodiment, where the hardware device is a light emitting device and includes a time data obtaining unit 601, a transmission unit 602, a buffering unit 603, and an execution unit 604.

The time data obtaining unit 601 is configured to control an application layer to obtain time data for controlling an on or off time of a light emitting device.

In a specific embodiment, the time data obtaining unit 601 further includes an encoding subunit 605, which is configured to control the application layer to obtain original data, and encode the original data to obtain the time data, for example, control the light emitting device to be 5 s on, 2 s off, 3 s on . . . .

Specifically, the original data may be data that is input by a user, for example, a bank card account number input by a user. In some embodiments, if the user directly inputs the time data that is used to control the on or off state of the light emitting device, that is, if the original data is the time data, it is not necessary for the encoding subunit 605 to perform an encoding operation.

Specifically, the light emitting device may be a light source of the electronic device, for example, an LED light source; or may be other light sources, for example, a light source connected to a mobile phone, a laser emitter or an LED.

The transmission unit 602 is configured to control the application layer to deliver the time data to the kernel driver layer.

The buffering unit 603 is configured to store the time data delivered by the application layer. After obtaining the time data delivered by the application layer, the kernel driver layer stores the time data into a buffering unit 603 disposed in the kernel driver layer. The buffering unit 603 is directly readable by the light emitting device driver, and the buffering unit 603 serves a purpose of temporarily saving the time data, and may be a buffer register. In other embodiments, the buffering unit 603 may also be some or all space that is separated from an existing system storage unit through a program method, and the some or all space is used as the buffering unit 603 in this embodiment.

The buffer register is also referred to as a buffer, which may be categorized into an input buffer and an output buffer. The former serves a purpose of temporarily storing data sent by a peripheral so that the data is available for being fetched by the processor; and the latter serves a purpose of temporarily storing data sent by the processor to the peripheral.

The buffer may serve a purpose of coordination and buffering between the CPU working at a high speed and the peripheral working at a low speed, and implement synchronization of data transmission.

The execution unit 604 is configured to control the application layer to invoke a light emitting device driver located on a kernel driver layer, control the light emitting device driver to read the time data stored in the buffering unit, and control a time of turning on or off the light emitting device according to the time data. After time data corresponding to to-be-sent data is delivered and stored, the application layer invokes the light emitting device driver on the kernel driver layer to ensure that the light emitting device is in an available state. After the light emitting device driver is invoked, the time data stored in the buffering unit is read, and the on or off time of the light emitting device is controlled according to the time data.

In some embodiments, the time data is an array. When the light emitting device driver controls the on or off time of the light emitting device according to the time data, the light emitting device driver controls the on or off time of the light emitting device according to order of data elements in the array. Certainly, in other embodiments, a format of the time data may be other feasible formats in the prior art.

In the module for controlling the light emitting device in an operating system according to this embodiment, the time data that is used to control the on or off state of the light emitting device is stored first in a buffering unit 303; after the time data is stored, the light emitting device driver is invoked, and the light emitting device driver reads the time data stored in the buffer, and controls the on or off time of the light emitting device according to the time data. The light emitting device driver reads the time data in the buffer continuously without delay, thereby ensuring data transmission accuracy and ensuring high-speed data transmission in optical communication.

It should be noted that the operating system in this embodiment may be an Android system, a Blackberry OS system, a Windows phone system, a Windows mobile system, an IOS system, a Mac OS system or the like. Although the systems differ, under the conception of the present invention, a person skilled in the art can make proper modifications to fulfill the purpose of implementing the module for controlling a light emitting device according to this embodiment.

In some embodiments, the state data may also be intensity data that is used to control light emitting intensity of the light emitting device. In other embodiments, if the hardware device is a vibrator, the state data may accordingly be intensity data that is used to control vibration intensity of the vibrator. For other hardware devices, the implementation principles are consistent with the implementation principles of the light emitting device, and are not detailed herein any further.

Embodiment 5

In this embodiment, a buffering unit is used to store state data first, where the state data is used to control a hardware device action, and data stored in the buffering unit is directly readable by a hardware device driver; after the state data is stored, invoking the hardware device driver, so that the hardware device driver reads state data stored in the buffering unit and controls a state of the hardware device action according to the state data. The hardware device driver reads the state data in the buffering unit continuously without delay or interruption, thereby ensuring data transmission accuracy and ensuring high-speed data transmission.

The hardware device in this embodiment may be a light emitting device, a vibrator, a Bluetooth device, a camera, a sensor, or a microphone. To facilitate description of this application, a light emitting device (a flash) is used as an example of the hardware device in this embodiment. Accordingly, the hardware device driver is a flash driver, the state data is time data, and the hardware device action is turning on or off the flash.

The following provides further detailed description on this application with reference to accompanying drawings and specific embodiments.

Figure 8:
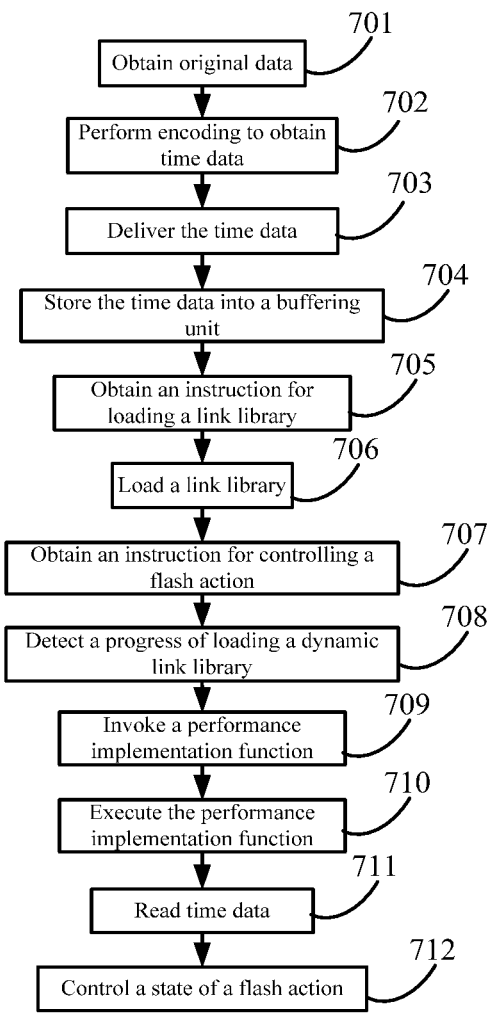
FIG. 8 is a schematic flowchart of a method for controlling a hardware device in an Android system according to Embodiment 5 of this application.

Referring to FIG. 8, a method for controlling a hardware device in an operating system is provided in this embodiment, including the following steps:

Steps 701-704 are the same as steps 501-504 in Embodiment 3.

Steps 705-710 are the same as steps 301-306 in Embodiment 1.

Step 711: A flash driver reads time data stored in a buffering unit.

Step 712: After reading the time data, the flash driver controls a time of turning on or off the light emitting device according to the time data.

Currently, the flash is generally used as only auxiliary hardware of a camera. The flash may be applied only when the camera is applied. Therefore, to use the flash in the Android system, the camera driver needs to be invoked first. The flash is controlled by setting camera parameters. That is, the flash is controlled in an indirect control manner.

A delay problem occurs when the flash is controlled by the camera driver. However, in the current application scope of the flash, the delay does not affect normal usage. However, with development of optical communication (for example, visible light communication), when information needs to be transmitted through light, due to requirements imposed by the optical communication on the transmission speed and information transmission accuracy, the delay problem becomes obvious and becomes one of obstacles of developing optical communication.

In this embodiment, a flash driver is disposed separately on a Linux kernel driver layer of the Android system, and the flash driver may be invoked directly for controlling the flash. The flash driver controls the flash in a direct control manner, which can avoid the delay that occurs when the flash is controlled by the camera driver.

It should be noted that in this embodiment, the manner of invoking a hardware device driver (a flash driver), which is described in steps 705-709, is a direct control manner. In other embodiments, an existing hardware device driver may be invoked in any manner in the prior art to control the hardware device action, for example, in the indirect control manner described above.

An interface function is defined on the JNI layer. The application layer invokes, from the link library according to the interface function on the JNI layer, the performance implementation function corresponding to the instruction for controlling the flash action, so that the performance implementation function is available for the flash driver on the Linux kernel driver layer to execute a corresponding performance implementation function.

When the operating system is an IOS system, syscall serves a purpose of an interface function at a native interface, where the interface function is defined on the JNI layer in the Android system, which is not detailed herein any further.

The interface function on the JNI layer defines a correspondence between a C/C++ function and a Java function. This interface function uses a JNI method to map the C/C++ function on the hardware abstraction layer onto the Java function on the application layer to implement interaction between the hardware abstraction layer (using a C/C++ language) and the application layer (using a Java language). led_on is a Java function. A bottom-layer performance function can be invoked only after the Java function is mapped by the JNI interface. The Java function is mapped to a native function on the JNI layer, and then the bottom-layer performance function is invoked in the function, where the name of the native function is java_full packet name_class name_led_on.

When a Dalvik virtual machine in an Android run environment invokes a member function, if it is found that the member function is a JNI method, the process is redirected to an address of the JNI method directly to execute the JNI method. That is, the JNI method is executed on a native operating system directly, but is not executed by a Dalvik virtual machine interpreter. Therefore, the JNI method is a means for direct communication between the Android application and the native operating system, and the JNI method makes communication more efficient.

Preferably, an instantiated address of the performance implementation function is stored on the JNI layer so that the JNI layer can directly invoke the performance implementation function conveniently. Instantiation refers to a process of using a class to create an object in object-oriented programming. For example, in a flash control process, the flash action is used as a class, and a specific performance implementation function such as turning on the flash and turning off the flash is created as an object. A process of creating the objects is instantiation. After the object is created, a corresponding address exists. When the performance implementation function is invoked later after the address is stored on the JNI layer, the corresponding object can be found quickly according to the address without needing to retrieve the class corresponding to the performance implementation function first.

In this embodiment, the following three structures are defined on the hardware abstraction layer. The three structures on the hardware abstraction layer in this embodiment are the same as those in Embodiment 1, and are not detailed herein any further.

In some embodiments, the time data is an array. Details of controlling the on or off time of the flash according to the time data by the flash driver are: controlling, by the light emitting device driver, the on or off time of the flash according to order of data elements in the array. Certainly, in other embodiments, a format of the time data may be other feasible formats in the prior art.

In the method for controlling the flash in an operating system according to this embodiment, the time data that is used to control the on or off state of the flash is stored first in a buffering unit; after the time data is stored, the light emitting device driver is invoked, and the flash driver reads the time data stored in the buffer, and controls the on or off time of the flash according to the time data. The flash driver reads the time data in the buffer continuously without delay, thereby ensuring data transmission accuracy and ensuring high-speed data transmission in optical communication.

It should be noted that the operating system in this embodiment may be an Android system, a Blackberry OS system, a Windows phone system, a Windows mobile system, an IOS system, a Mac OS system or the like. Although the systems differ, under the conception of the present invention, a person skilled in the art can make proper modifications to fulfill the purpose of implementing the method for controlling a light emitting device according to this embodiment.

In some embodiments, the state data may also be intensity data that is used to control light emitting intensity of the flash. In other embodiments, if the hardware device is a vibrator, the state data may accordingly be intensity data that is used to control vibration intensity of the vibrator. For other hardware devices, the implementation principles are consistent with the implementation principles of the flash, and are not detailed herein any further.

Embodiment 6

Figure 9:
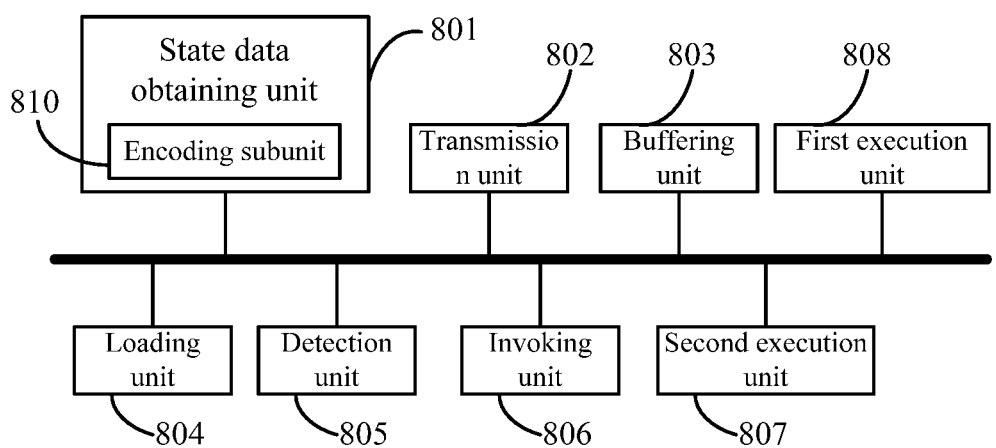
FIG. 9 is a schematic structural diagram of a module for controlling a hardware device in an Android system according to Embodiment 6 of this application.

Referring to FIG. 9, corresponding to the method for controlling a hardware device in an operating system according to Embodiment 5, a module for controlling a hardware device in an operating system is further provided in this embodiment, where the module includes a state data obtaining unit 801, a transmission unit 802, a buffering unit 803, a loading unit 804, a detection unit 805, an invoking unit 806, a first execution unit 808, and a second execution unit 807.

The state data obtaining unit 801 is configured to obtain state data for controlling the hardware device action.

The transmission unit 802 is configured to deliver the state data.

The buffering unit 803 is configured to store the state data delivered by the transmission unit 802.

The first execution unit 808 is configured to invoke a hardware device driver, control the hardware device driver to read the state data stored in the buffering unit 803, and control a state of the hardware device action according to the state data.

The loading unit 804 is configured to obtain an instruction for loading a link library, and load the link library, where the link library includes a performance implementation function for controlling a hardware device action.

The detection unit 805 is configured to obtain an instruction for controlling the hardware device action.

The invoking unit 806 is configured to invoke, from the link library, a performance implementation function corresponding to the instruction for controlling the hardware device action.

The second execution unit 807 is configured to control a hardware device driver to execute the invoked performance implementation function to control a hardware device to perform a corresponding action.

In a specific embodiment, the state data obtaining unit 801 further includes an encoding subunit 810, configured to obtain original data, and encode the original data to obtain the state data.

In a specific embodiment, the hardware device is a light emitting device, a vibrator, a Bluetooth device, a camera, a sensor, or a microphone.

In a specific embodiment, when the hardware device is a light emitting device, the hardware device driver is a light emitting device driver, the state data is an array indicating time data, and when the first execution unit 808 controls the hardware device driver to control a state of the hardware device according to the state data, the first execution unit 808 controls the light emitting device driver to control a time of turning on or off the light emitting device according to order of data elements in the array.

In a specific embodiment, the state data is an array indicating time data, luminance data, or intensity data.

In a specific embodiment, the operating system is an Android system, a Blackberry OS system, a Windows phone system, a Windows mobile system, an IOS system, or a Mac OS system.

In a specific embodiment, when the operating system is an Android system, a hardware device driver is disposed in a kernel driver layer in the Android system, and the second execution unit 807 is configured to control the hardware device driver to execute the invoked performance implementation function to control the hardware device to perform a corresponding action; or when the operating system is an IOS system, the hardware device driver is disposed in a core system layer in the IOS system, and the second execution unit 807 is configured to control the hardware device driver to execute the invoked performance implementation function to control the hardware device to perform a corresponding action.

In a specific embodiment, when the operating system is an Android system, an architecture of the Android system further includes a JNI layer, and a corresponding JNI interface function is defined on the JNI layer, and the invoking unit 806 is configured to invoke, from the link library according to the interface function, the performance implementation function corresponding to the instruction for controlling the hardware device action, so that the performance implementation function is available for the hardware device driver on the kernel driver layer to execute a corresponding performance implementation function; or when the operating system is an IOS system, use a LibSystem library to access an interface function provided by the core system layer, and the invoking unit 806 is configured to invoke, from the link library according to the interface function, the performance implementation function corresponding to the instruction for controlling the hardware device action, so that the performance implementation function is available for the hardware device driver on the kernel driver layer to execute a corresponding performance implementation function.

In a specific embodiment, an instantiated address of the performance implementation function is stored on the JNI layer.

When the operating system is an Android system, an architecture of the Android system further includes a hardware abstraction layer, and the hardware abstraction layer runs on the kernel driver layer, and is used to provide hardware device control interface implementation for an application framework layer and a JNI layer of the Android system under support of the kernel driver layer; or when the operating system is an IOS system, the IOS system further includes a core service layer.

It should be noted that in this embodiment, the manner of invoking a hardware device driver (a flash driver) by the loading unit 804, the detection unit 805, the invoking unit 806, and the second execution unit 807 is a direct control manner. In other embodiments, the first execution unit 808 may invoke an existing hardware device driver in any manner in the prior art to control the hardware device action, for example, in the indirect control manner described above.

The module for controlling a hardware device in an operating system according to this embodiment corresponds to the method for controlling a hardware device, and its working principles are not detailed herein any further.

In a method and a module for controlling a hardware device in an operating system according to the embodiments of this application, after state data for controlling a hardware device action is obtained, the state data is delivered and stored into a buffering unit, and then a hardware device driver is invoked, and the hardware device driver reads state data stored in the buffering unit and controls a state of a hardware device action according to the state data. The invoking the hardware device driver specifically includes: invoking an existing hardware device driver to control the hardware device action; or obtaining an instruction for loading a link library and loading the link library; after obtaining an instruction for controlling the hardware device action, invoking, from the link library, a performance implementation function corresponding to the instruction for controlling the hardware device action; and then executing the invoked performance implementation function to control a hardware device to perform a corresponding action. In the method and module for controlling a hardware device in an operating system according to this application, the hardware device driver uses a direct control manner to control the hardware device to execute a corresponding action. In addition, because the state data is stored in the buffering unit, the state data stored in the buffering unit is read directly after the hardware device driver is invoked. The reading process is continuous, which avoids problems such as interruption and delay in a process of driving the hardware device action by the hardware device driver, improves data transmission accuracy, and ensures high-speed data transmission.

A person skilled in the art may understand that all or a part of the steps of methods in the foregoing embodiments may be implemented by a program instructing relevant hardware. The program may be stored in a computer readable storage medium, where the storage medium may include a read-only memory, a random access memory, a magnetic disk, or an optical disc or the like.

The foregoing content is detailed description that is made about this application with reference to specific implementation manners, but specific implementation of this application shall not be limited to such description. A person of ordinary skill in the art may simply obtain derivatives or replacements without departing from the conception of this application.

What is claimed is:

1. A method for controlling a hardware device in an operating system, comprising:
    obtaining an instruction for loading a link library, and loading the link library, the link library comprises a performance implementation function for controlling a hardware device action;
    obtaining an instruction for controlling the hardware device action;
    invoking, from the link library, a performance implementation function corresponding to the instruction for controlling the hardware device action; and
    executing the invoked performance implementation function to control a hardware device to perform a corresponding action;
    wherein before the obtaining an instruction for loading a link library, the method further comprises:
    obtaining state data for controlling the hardware device action;
    delivering and storing the state data into a buffering unit; and
    after the executing the invoked performance implementation function, the method further comprises:
    invoking a hardware device driver, the hardware device driver reads the state data stored in the buffering unit, and controlling a state of the hardware device action according to the state data;
    wherein obtaining state data for controlling the hardware device action comprises:

obtaining an original data;
encoding the original data to obtain the state data;
wherein encoding the original data to obtain the state data comprises:
encoding each different digit in the N-ary data of the original data into a different electric signal unit, where high level duration in the electric signal unit is Ti1, Ti2 . . . , Tij, low level duration in the electric signal unit is Tij, wherein i, j, and N are natural numbers, different electric signal units are separated by delimiters to obtain the state data,
wherein the hardware device is a light emitting device, the hardware device driver is a light emitting device driver, the state data is an array indicating time data, and the controlling, by the hardware device driver, a state of the hardware device action according to the state data is specifically: controlling, by the light emitting device, a time of turning on or off the light emitting device according to order of data elements in the array.

2. The method according to claim 1, wherein when the operating system is an Android system, the hardware device driver is disposed in a kernel driver layer in the Android system, and the hardware device driver executes the invoked performance implementation function to control the hardware device to perform a corresponding action; a corresponding Jave Native Interface (JNI) interface function is defined on a JNI layer of the Android system, and the method further comprises:
after obtaining the instruction for loading a link library and loading the link library, invoking, from the link library according to the interface function, the performance implementation function corresponding to the instruction for controlling the hardware device action, so that the performance implementation function is available for the hardware device driver on the kernel driver layer to execute a corresponding performance implementation function; or
when the operating system is an iPhone Operating System (IOS) system, the hardware device driver is disposed in a core system layer in the IOS system, and the hardware device driver executes the invoked performance implementation function to control the hardware device to perform a corresponding action; the IOS system use a LibSystem library to access an interface function provided by the core system layer; and
after obtaining the instruction for loading a link library and loading the link library, invoking, from the link library according to the interface function, the performance implementation function corresponding to the instruction for controlling the hardware device action, so that the performance implementation function is available for the hardware device driver on the core system layer to execute a corresponding performance implementation function.

3. The method according to claim 2, wherein an instantiated address of the performance implementation function is stored on the JNI layer.

4. The method according to claim 2, wherein when the operating system is an Android system, the Android system further comprises a hardware abstraction layer, and the hardware abstraction layer of the Android system runs on the kernel driver layer, and is used to provide hardware device control interface implementation for an application framework layer and a JNI layer of the Android system under support of the kernel driver layer; or
when the operating system is an IOS system, the IOS system further comprises a core service layer.

5. A module for controlling a hardware device in an operating system, comprising: a hardware processor coupled with a memory and configured to execute program instructions stored on the memory, wherein the program instructions comprise:
obtaining an instruction for loading a link library, and load the link library, the link library comprises a performance implementation function for controlling a hardware device action;
obtaining an instruction for controlling the hardware device action;
invoking, from the link library, a performance implementation function corresponding to the instruction for controlling the hardware device action; and
executing the invoked performance implementation function to control a hardware device to perform a corresponding action;
wherein before the obtaining an instruction for loading a link library, the method further comprises:
obtaining state data for controlling the hardware device action;
delivering the state data;
storing the state data delivered by the transmission unit; and
after the executing the invoked performance implementation function, the method further comprises:
invoking a hardware device driver, control the hardware device driver to read the state data stored in the buffering unit, and controlling a state of the hardware device action according to the state data,
when invoking the hardware device driver, invoking an existing hardware device driver to control the hardware device action;
obtaining an original data; encoding the original data to obtain the state data; wherein encoding each different digit in the N-ary data of the original data into a different electric signal unit, where high level duration in the electric signal unit is Ti1, Ti2 . . . , Tij, low level duration in the electric signal unit is Tij, wherein i, j, and N are natural numbers, different electric signal units are separated by delimiters to obtain the state data;
wherein the hardware device is a light emitting device, the hardware device driver is a light emitting device driver, the state data is an array indicating time data, and the controlling, by the hardware device driver, a state of the hardware device action according to the state data is specifically: controlling, by the light emitting device, a time of turning on or off the light emitting device according to order of data elements in the array.

6. The module according to claim 5, wherein the program instructions further comprise:
wherein when the operating system is an Android system, the hardware device driver is disposed in a kernel driver layer in the Android system, controlling the hardware device driver to execute the invoked performance implementation function to control the hardware device to perform a corresponding action; an architecture of the Android system further comprises a Jave Native Interface (JNI) layer, and a corresponding JNI interface function is defined on the JNI layer;
invoking, from the link library according to the interface function, the performance implementation function corresponding to the instruction for controlling the hardware device action, so that the performance implementation function is available for the hardware device driver on the kernel driver layer to execute a corresponding performance implementation function; or when the operating system is an iPhone Operating System (IOS) system, the hardware device driver is disposed in a core system layer in the IOS system, controlling the hardware device driver to execute the invoked performance implementation function to control the hardware device to perform a corresponding action; the IOS system use a LibSystem library to access an interface function provided by the core system layer; and a Lib System library to access an interface function provided by the core system layer; and invoking, from the link library according to the interface function, the performance implementation function corresponding to the instruction for controlling the hardware device action, so that the performance implementation function is available for the hardware device driver on the kernel driver layer to execute a corresponding performance implementation function.

7. The module according to claim 6, wherein the program instructions further comprise:

wherein an instantiated address of the performance implementation function is stored on the JNI layer.

8. The module according to claim 6, wherein the program instructions further comprise:

wherein when the operating system is an Android system, an architecture of the Android system further comprises a hardware abstraction layer, and the hardware abstraction layer runs on the kernel driver layer, and is used to provide hardware device control interface implementation for an application framework layer and a JNI layer of the Android system under support of the kernel driver layer; or when the operating system is an IOS system, the IOS system further comprises a core service layer.

9. A method for controlling a hardware device in an operating system, comprising:

obtaining state data for controlling a hardware device action;

delivering and storing the state data into a buffering unit; and invoking a hardware device driver to read the state data stored in the buffering unit, and controlling a state of the hardware device action according to the state data;

wherein the hardware device is a light emitting device, the hardware device driver is a light emitting device driver, the state data is an array indicating time data, and the controlling, by the hardware device driver, a state of the hardware device action according to the state data is specifically: controlling, by the light emitting device, a time of turning on or off the light emitting device according to order of data elements in the array;

wherein obtaining state data for controlling a hardware device action comprises: obtaining an original data; encoding the original data to obtain the state data; wherein encoding the original data to obtain the state data comprises: encoding each different digit in the N-ary data of the original data into a different electric signal unit, where high level duration in the electric signal unit is $Ti1, Ti2 \ldots, Tij$, low level duration in the electric signal unit is $Tij$, wherein $i$, $j$, and $N$ are natural numbers, different electric signal units are separated by delimiters to obtain the state data.

* * * * *